United States Patent [19]

Capilli et al.

[11] Patent Number: 5,060,718
[45] Date of Patent: Oct. 29, 1991

[54] PRECAST WALL WITH THERMIC REGULATION ELEMENTS

[76] Inventors: Sergio Capilli, 19 Via Ottavilla; Anna D. Capilli, 607 Via Aurelia, both of, Rome, Italy

[21] Appl. No.: 586,820

[22] Filed: Sep. 24, 1990

[30] Foreign Application Priority Data

Dec. 19, 1989 [IT] Italy .................................. 48673 A89

[51] Int. Cl.$^5$ ........................ F24D 11/00; F28D 20/00
[52] U.S. Cl. ......................................... 165/56; 165/10; 165/104.19; 165/104.14; 165/104.11; 165/53; 126/434; 126/436
[58] Field of Search ............... 126/436, 431, 433, 434; 165/10, 53, 104.19, 104.14, 104.11, 56

[56] References Cited

U.S. PATENT DOCUMENTS

| | | | |
|---|---|---|---|
| 4,250,958 | 2/1981 | Wasserman | 165/10 |
| 4,442,826 | 4/1984 | Pleasants | 165/53 |
| 4,545,364 | 10/1985 | Maloney | 126/434 |

FOREIGN PATENT DOCUMENTS 37657 3/1982 Japan .................................. 126/431

Primary Examiner—Albert W. Davis, Jr.
Attorney, Agent, or Firm—Nields & Lemack

[57] ABSTRACT

A prefabricated wall is constructed of pre-cast concrete in such a way as to have embedded therein (1) a plurality of heat-accumulator elements and (2) channels adapted to receive, after installation of the prefabricated wall element, suitable pipes and plumbing connectors for the conveyance of heated water. Each heat-accumulator element is substantially filled with water prior to being embedded in the concrete of the wall element. Each heat accumulator element is positioned so that at least one channel passes close thereto, so that heat flows from the heated water to the water in the heat accumulator element through membranes which separate the heated water from the water in the heat accumulator element.

8 Claims, 6 Drawing Sheets

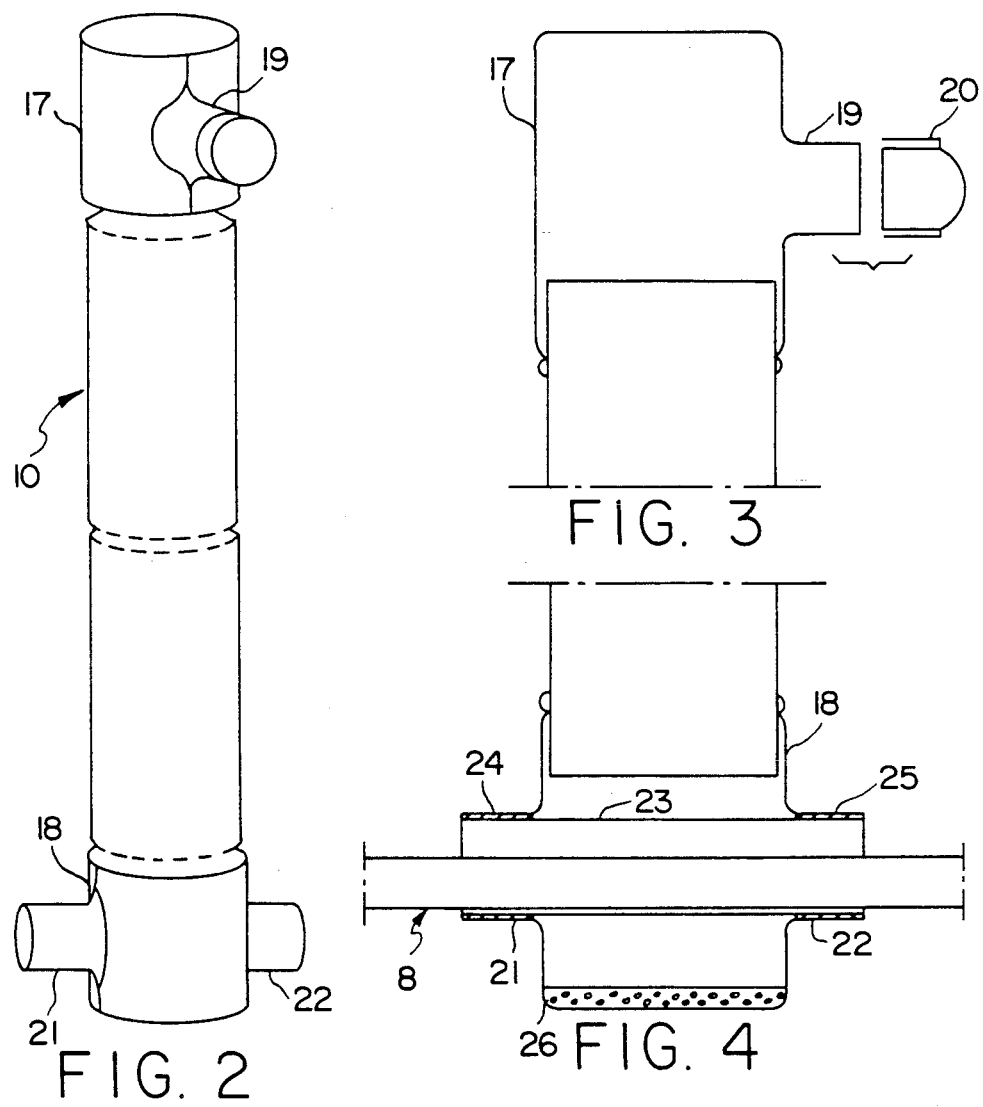
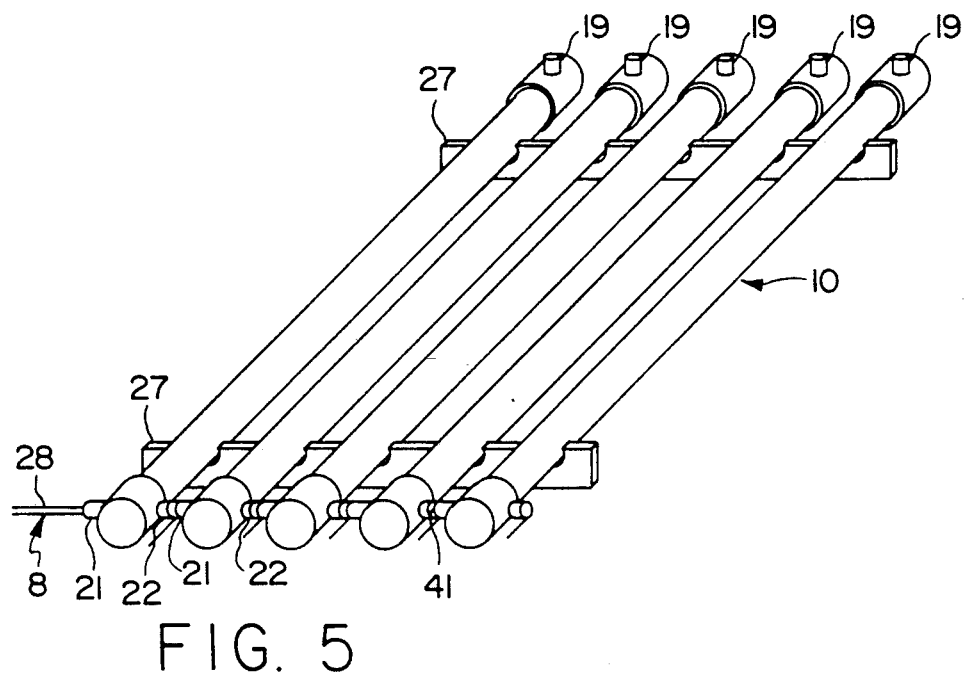

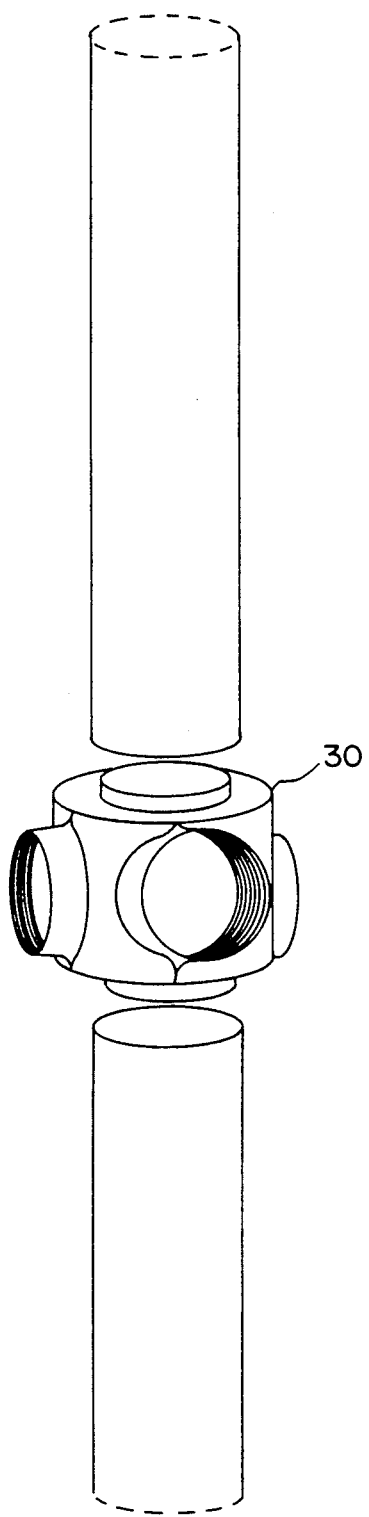
FIG. 8
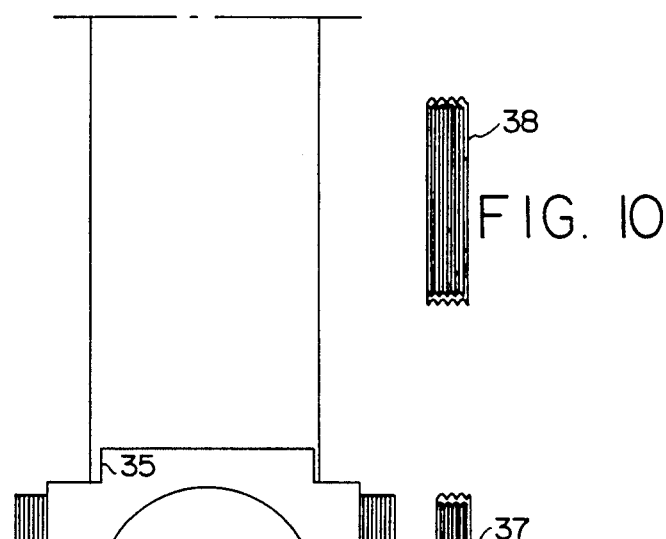
FIG. 10
FIG. 9
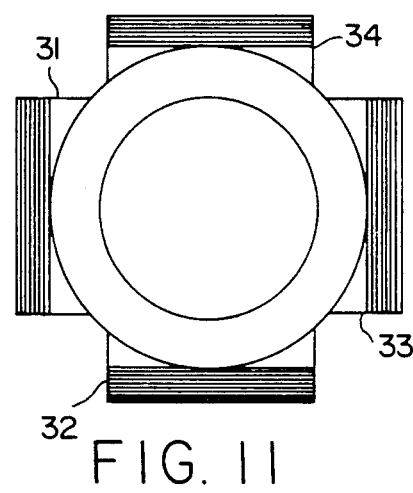
FIG. 11

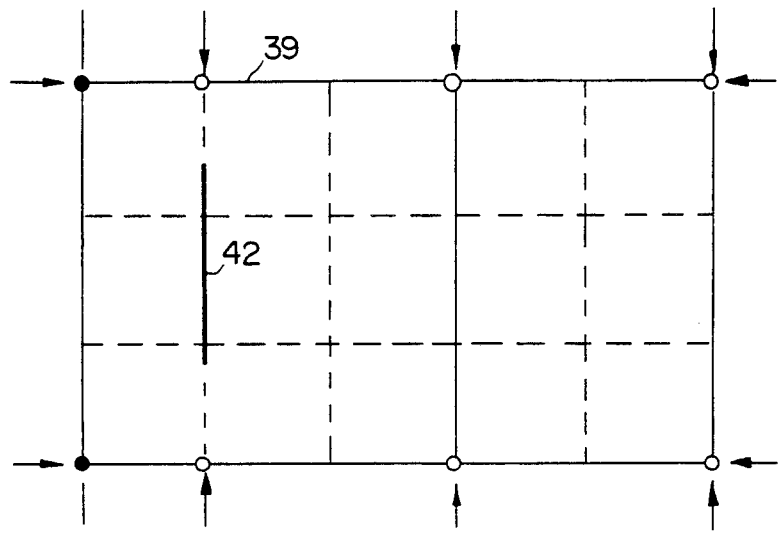
FIG. 12
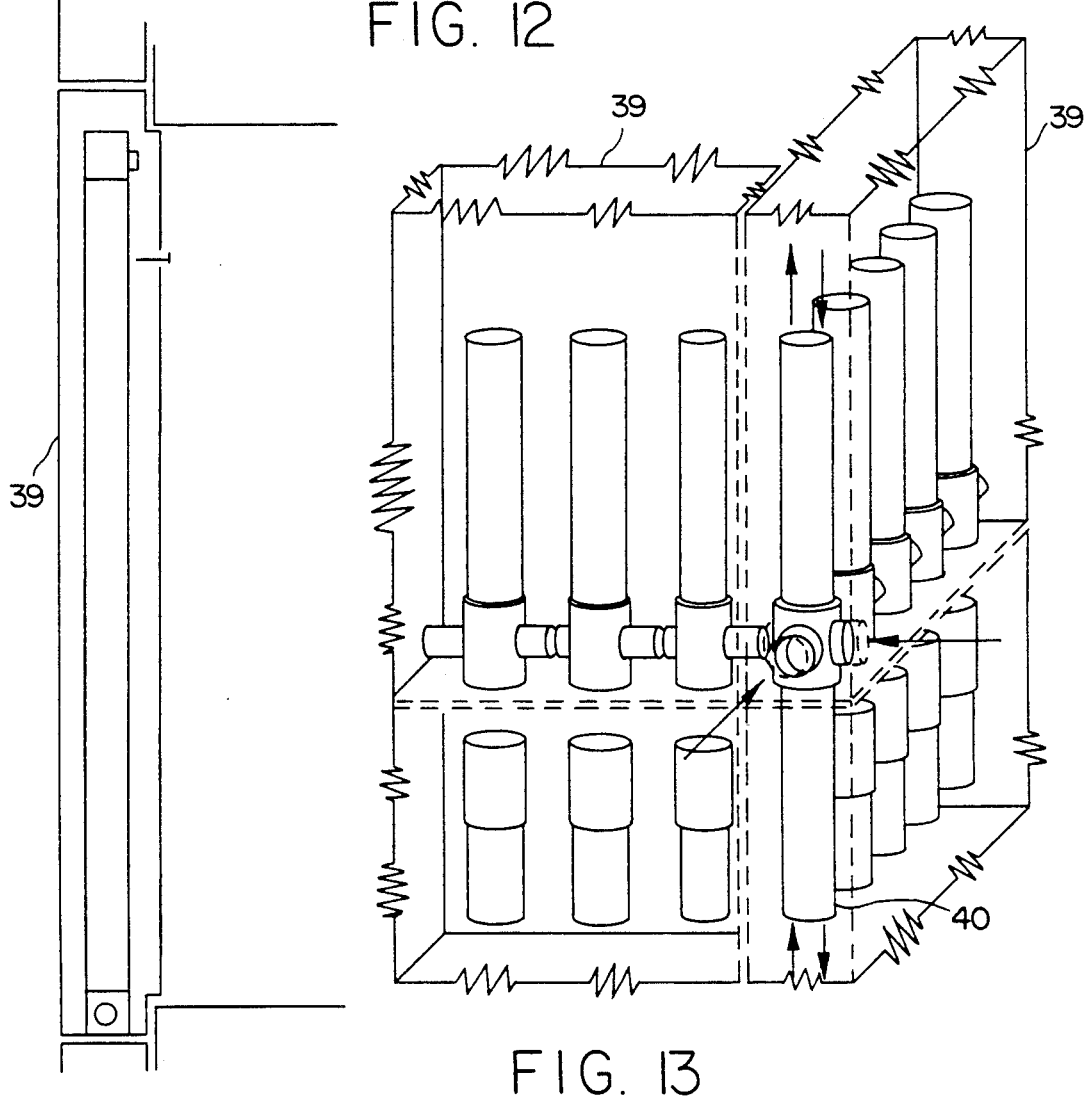
FIG. 13
FIG. 14

5,060,718

PRECAST WALL WITH THERMIC REGULATION ELEMENTS

BACKGROUND OF THE INVENTION

1. Field of the Invention

This invention relates to buildings heated by solar energy and in particular to buildings wherein water which has been heated by solar energy is conveyed to various portions of the building so as to provide heat where required.

2. Description of the Prior Art

Various structures are known wherein elements of a building such as its walls, floors, or ceilings have passageways constructed therein which act as conduits for fluid flow, such as water or air.

For example, U.S. Pat. No. 2,559,198 to Ogden discloses a prefabricated section of a floor equipped with suitable tubes for the circulation of a heating or cooling medium. The tubes are embedded into the sections.

As another example, U.S. Pat. No. 4,257,481 to Dobson discloses a concrete element having pipes embedded therein as conduits for water. As a further example, U.S. Pat. No. 4,285,332 to McHugh discloses a building having a solar heating system integrated in the architecture of the building.

Other known prior art includes solar collectors in which heat from the sun raises the temperature of a liquid flowing through a conduit, heat pumps for the transfer of heat from one system to another so as to raise the temperature of the latter system above that of the former system, heat accumulators wherein a liquid whose temperature has been raised is stored for subsequent heating of other elements, and devices wherein heat is transferred from one liquid system to a neighboring liquid system through suitable membranes.

However, the prior art does not disclose prefabricated structural members such as walls in which an efficient allocation is made between the elements embedded in the prefabricated structural member and the elements which may be installed within the prefabricated structural member after the latter has been put into place.

SUMMARY OF THE INVENTION

The invention provides a prefabricated structural member such as a wall in which an efficient allocation is made between the elements embedded in the prefabricated structural member and the elements which may be installed within the prefabricated structural member after the latter has been put into place. More specifically, a prefabricated wall element constructed in accordance with the invention has embedded therein (1) a plurality of heat accumulator elements and (2) channels for subsequent insertion of suitable interconnected pipes and plumbing connections for heated water, said channels passing adjacent to said heat accumulator elements so that heat flows from said heated water to said heat accumulator elements through membranes which separate them.

The invention concerns a reinforced concrete wall, either normal or lightweight, either exterior or interior, having embedded therein channels for the accommodation of a circuit which carries water warmed by solar panels and also having embedded therein heat accumulation elements full of water whose temperature is regulated by the circuit, there being suitable coupling between the circuit and the heat accumulation elements.

Walls of every kind receive heat passively, either by adduction or by radiation, and are always exposed to water-vapor condensation. In recent times reinforced concrete walls, particularly those with exterior insulation, either aired or not, have been designed so that, when installed, they dissipate less heat, consume less power, and maintain interior comfort at acceptable levels. Unfortunately, the bulk necessary for good heat accumulation and the high costs for the insulation itself and the strata finishing are among the disadvantages of such constructions. An object of the present invention is to produce a wall which is light and, although expensive, is able to help the heating system to obtain an economic power consumption and a better level of interior comfort. In fact, the wall of the present invention can regulate its surface temperature and its heat accumulation. Finally, this accumulation of heat serves to eliminate water-vapor condensation in the exterior walls.

The invention may best be understood from the following detailed description of a preferred embodiment thereof, having reference to the accompanying drawings, which provide a schematic example, and in which:

BRIEF DESCRIPTION OF THE DRAWINGS

FIG. 2 is an isometric view showing a heat accumulation element constructed in accordance with the invention;

FIG. 3 is a vertical central section showing in detail the upper portion of the heat accumulation element of FIG. 2;

FIG. 4 is a vertical central section showing in detail the lower portion of the heat accumulation element of FIG. 2;

FIG. 5 is an isometric view showing a plurality of the heat accumulation elements of FIG. 2 arranged in an array in accordance with the invention prior to casting of the wall of the invention;

FIG. 8 is an isometric view showing a connector component for joining sections of the vertical and horizontal channels of the invention;

FIG. 9 is a detail of the connector component of FIG. 8 showing a sealing plug;

FIG. 10 is a detail showing a reduction plug for use in the connector component of FIG. 8;

FIG. 11 is a horizontal section of the connector component of FIG. 8;

FIG. 12 is a diagram showing a representative configuration of the various elements of the invention;

FIG. 13 is an isometric view of a portion of the configuration of FIG. 12 showing the connections between the horizontal and vertical channels of the invention; and FIG. 14 is a vertical section of a portion of a wall showing the positioning of the heat accumulator element of the invention within the wall.

DETAILED DESCRIPTION OF THE INVENTION

Figure 1:
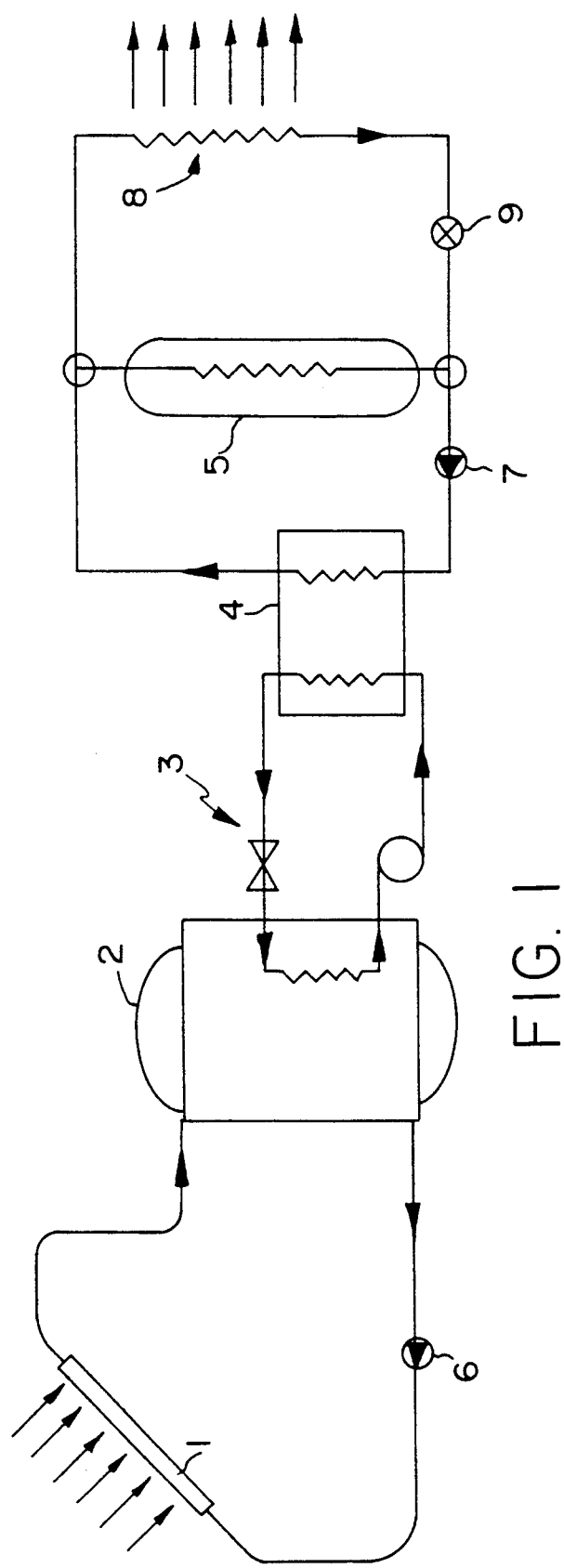
FIG. 1 is a simplified sketch of a low temperature solar panel circuit with which the invention may be employed.

Referring to the drawings, and first to FIG. 1 thereof, FIG. 1 is a simplified sketch of a low temperature solar panel circuit which includes the following known elements: a solar panel 1, a first accumulator tank 2, a heat pump 3, a second accumulator tank 4, and a sanitary water unit 5.

A pump 6 circulates water between the solar panel 1 and the accumulator tank 2. The solar panel 1 heats the water passing therethrough to a temperature of about 30° C. This heated water is pumped into the first accumulator tank 2 by the pump 6, so that the water in the first accumulator tank 2 is maintained at about 30° C. The heat pump 3 then circulates its fluid between the first accumulator tank 2 and the second accumulator tank 4, so as to maintain a temperature of about 50° C. in the second accumulator tank 4. A pump 7 circulates water between the second accumulator tank 4 and the sanitary water unit 5. The water traveling through the sanitary water unit 5 is thus warmed by passing through the second accumulator tank 4.

In accordance with the invention, parallel to the sanitary water unit 5 is another circuit 8 which distributes the wall-warming water through a valve 9. The coupling of a heat pump with low temperature solar panels allows the system to work at peak efficiency (i.e. with low power consumption) when the pump covers a small difference in temperature in periods of high solar heating. In periods of low solar heating and at nighttime the pump can still work, though at a low efficiency level, to provide the necessary heat. It follows that the interior surface temperature, which is related to the temperature of the water in the wall circuit 8, can be maintained at an acceptable level of interior comfort independently of the heating system used in the house.

The circuit 8 includes a multiplicity of conduits arranged within the walls of the building. These conduits convey water which has been heated by the heat pump to the lower part of the interior of the prefabricated walls of the building.

However, in accordance with the invention, heat accumulation within the walls is provided by separate components: namely, a multiplicity of heat accumulator elements which are filled with water and sealed off. Heat is delivered from the circuit 8 to the water in the heat accumulator elements by thermal conduction through thin membranes separating the water in the heat accumulator elements from the water in the circuit 8. Since the heat accumulator elements are sealed, means are provided to compensate for thermal expansion and contraction, which results from freezing of the water therein.

FIG. 2 shows an individual heat accumulation element 10. It is preferably made of a normal plastic pipe welded at the ends with two fibroreinforced plastic components 17, 18. The upper component 17 is shown in FIG. 3 and has a cylindrical bulge 19 grafted onto its lateral surface through which water may flow when the element 10 is initially filled with water. After filling, the bulge 19 is sealed with a top 20. The lower component 18 is shown in FIG. 4 and has two cylindrical bulges 21, 22 grafted onto its lateral surface. A metallic dissipator 23 is supported within the bulges 21, 22 through two seals 24, 25 which absorb any pipe deformations. A spacer 26 made of deformable plastic, along with the airspace at the top of the element in the vicinity of bulge 19 absorb the local deformations produced by the change of state from water to ice. The airspace at the top of the element may be of any suitable dimension, preferably at least one centimeter.

The metallic dissipator 23 constitutes one of the membranes which separates the water in the circuit 8 from the water in the heat accumulator elements 10. Many of the various conduits which make up the circuit 8 are constructed so as to pass through the cylinders formed by the metallic dissipators 23. Thus the outer surface of these conduits of the circuit 8 are close to the inner surface of the cylinders of the metallic dissipators 23. Heat from the warm water in the conduit passes by radiation or convection to the water within the heat accumulator element, passing through the metal membranes (namely, the wall of the conduit 8 and the metal dissipator 23).

FIG. 5 shows a plurality of heat accumulation elements 10 before the casting of the wall. These elements are held in place by racks 27 made of concrete. The upper bulges 19 facilitate water intake when the heat accumulation elements 10 are initially filled with water. The lower bulges 21, 22 are positioned so as to align the metallic dissipators 23 therein so as to receive a conduit of the circuit 8. Thus each lower bulge 22 may be in contact with the lower bulge 21 of a neighboring heat accumulation element 10, and leakage of concrete between adjacent bulges 22, 21 may be prevented by use of a suitable tape 41. In this way the sequence of bulges 21, 22 forms a horizontal channel adapted to receive a conduit of the circuit 8. Therefore, the heat captured in the solar panels 1 passes from the circuit 8 to the dissipator 23, which in turn heats the water in contact with it. The resultant temperature gradient between the heated bottoms of the elements 10 and the tops thereof results in a motion of the water in the elements 10 which distributes the heat throughout these elements; then the heat conduction through the concrete and the surface radiation carries the heat to the exterior.

Figure 6:
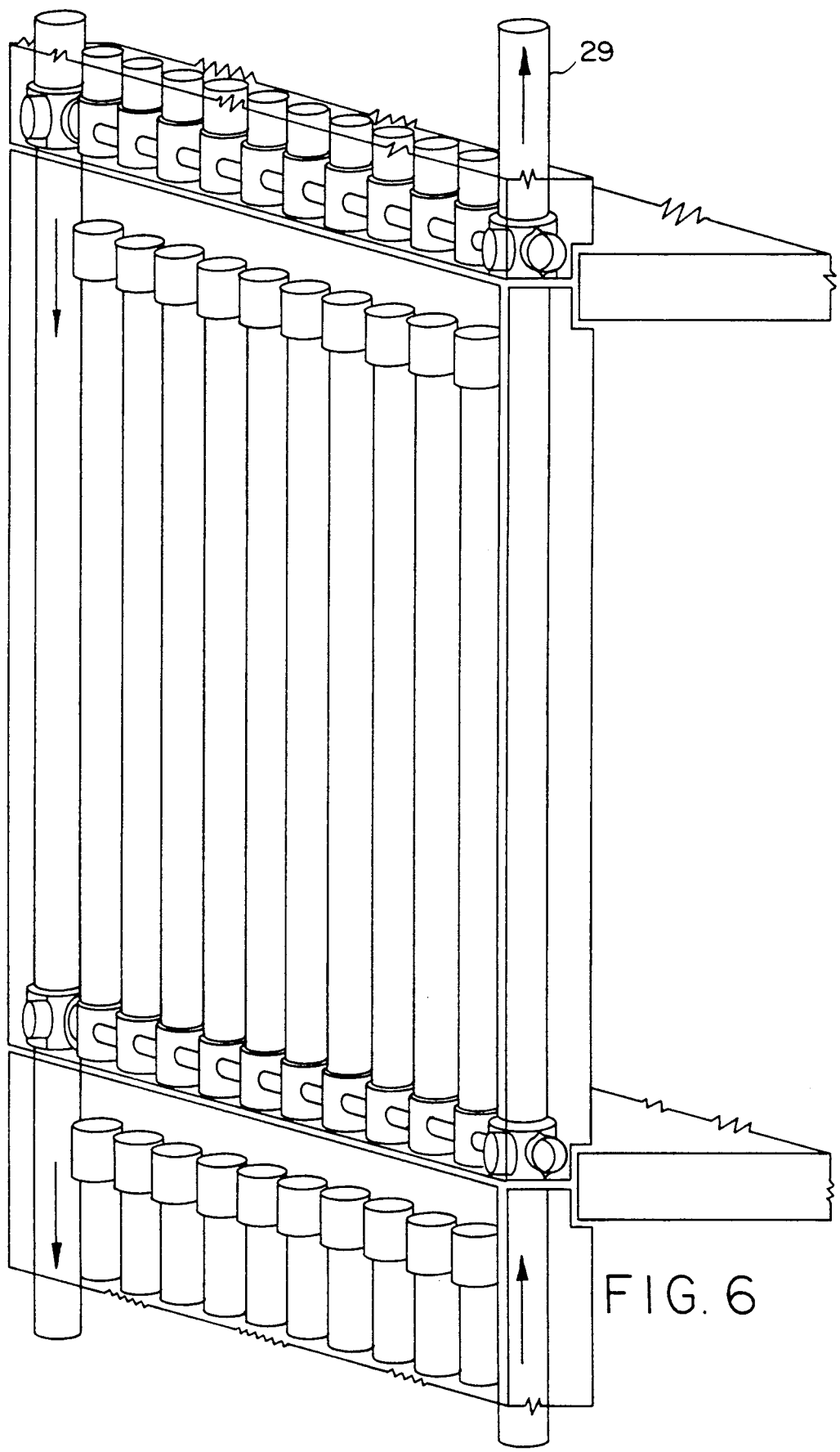
FIG. 6 is an isometric view of an exterior wall having therein the elements of FIG. 2 arranged in accordance with the invention, and also showing a portion of the horizontal and vertical channels of the invention.
Figure 7:
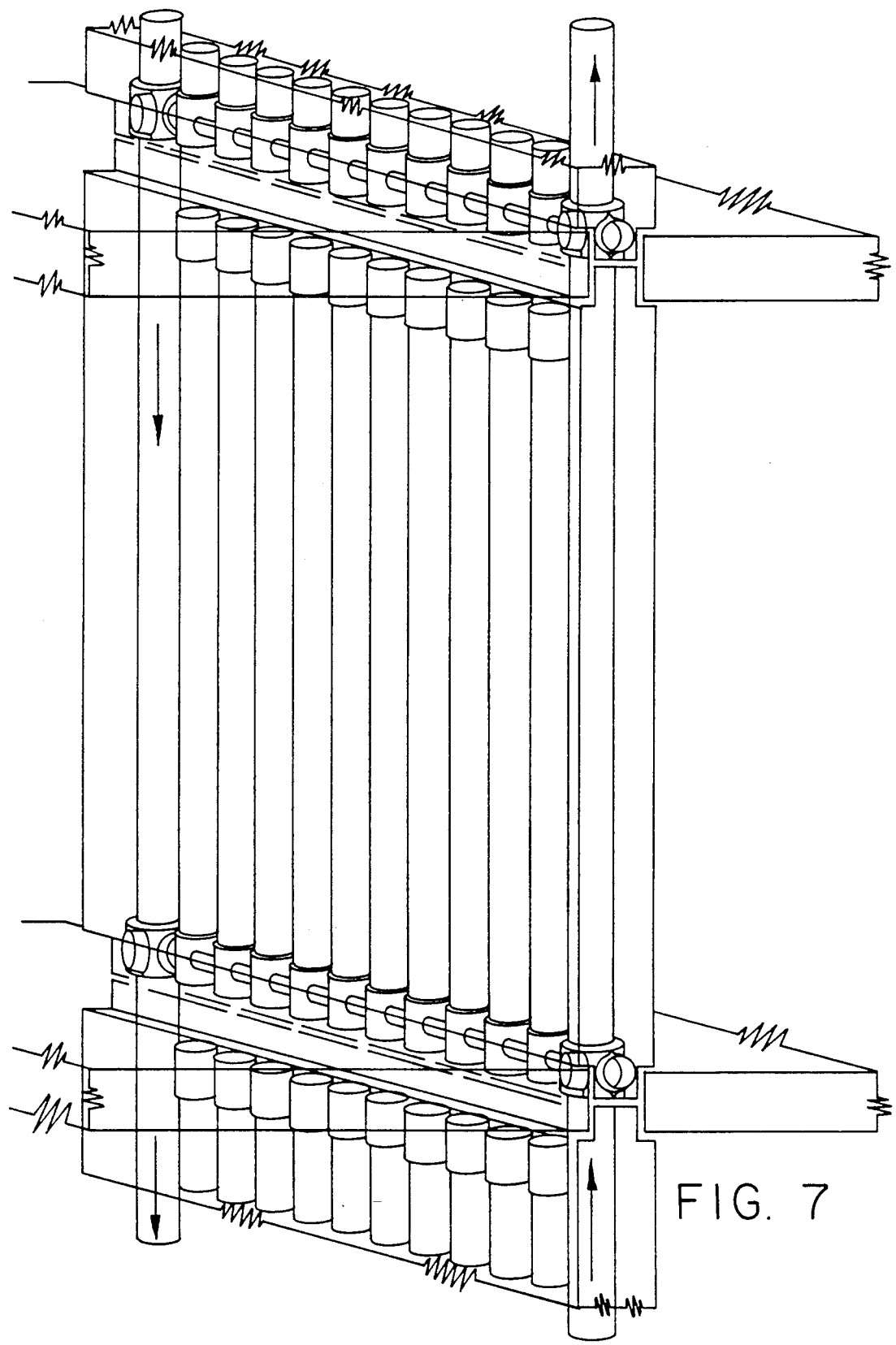
FIG. 7 is a view, similar to that of FIG. 6, but showing an interior wall.

FIG. 6 shows an exterior wall and FIG. 7 an interior wall in place with the heat accumulation elements in evidence. Both figures show the vertical assembling continuity which, in the exterior wall, eliminates the wall-floor thermic connection. They also illustrate the horizontal and vertical channels for the circuit 8 of FIG. 1. The horizontal channels, formed by the lower bulges 21, 22, are adapted to receive horizontal metallic heat dissipator pipes 28. The vertical channels 40 are adapted to receive vertical plastic adducent pipes 29. The vertical channels are aligned by superimposition of the element shown in FIG. 8. FIG. 8 is an assembly of a normal plastic pipe (acting as a vertical channel) with a special connector 30 made of fibroreinforced plastic. This connector is characterized by four cylindrical bulges 31, 32, 33, 34 grafted onto its lateral surface so as to define two orthogonal transverse axes and by two bulges 35, 36 grafted onto the two end surfaces. The four cylindrical bulges 31, 32, 33, 34 are equipped with threading to allow the attachment of either a sealing plug 37 or a reduction plug 38.

Referring now to FIG. 13, therein are shown several wall elements constructed according to the invention and arranged as they would be assembled in a building. Each wall element contains within it a set of heat accumulator elements aligned so that their lower bulges are in alignment so as to form a horizontal channel through the wall. Each heat accumulator element is sealed with a suitable amount of water within it. Some of the wall elements also have within them one or more vertical channels 40, and these are provided with the special connector elements of FIG. 8. The outermost bulges 21, 22 in each wall element fits into a reduction plug 38 of a connector 30. After assembly of the wall elements, and indeed even during occupancy of the building, the connections of the conduits for the circuit 8 may be made. The horizontal conduits may be inserted as shown by the horizontal arrows. Horizontal conduits are inserted through the reduction plugs affixed to the ends of the horizontal channels, which are screwed on prior to insertion of the horizontal conduits. The horizontal conduits are positioned approximately centrally in the aligned bulges, and may easily be inserted. The vertical conduits may be inserted in the vertical channels 40, there being a plurality of vertical conduits in each vertical channel 40, so that water may flow therethrough upwardly in some conduits and downwardly in other conduits, as shown by the vertical arrows. Connections among all the conduits are made by conventional plumbing fixtures, and the connecting operations are performed through the outer apertures in the special connector of FIG. 8. These outer apertures may be positioned so as to protrude from the wall element at the time of casting the concrete, or else they may be affixed to a length of vertical channel 40 which itself protrudes from the wall element at the time of casting the concrete.

As shown in FIG. 13, the preferred position for the special connector 30 is at the bottom of its wall element 39, near a corner thereof. Of the four lateral bulges 31, 32, 33, 34 at least one of the interior bulges will have a reduction plug 38 inserted therein to align and position the horizontal metallic heat dissipator pipe 28. In the corner position shown in FIG. 13, the two interior bulges will be so equipped. During assembly the two exterior bulges will remain open so that suitable plumbing connections may be made between the ends of the horizontal dissipator pipes 28 and the vertical adducent pipes 29. After assembly, the two exterior bulges may be closed by suitable sealing plugs 37.

Of the two end bulges 35, 36, as shown in FIG. 13, one may be connected to the vertical channel 40 and embedded therewith in the concrete of the wall element 39. The other may communicate with the exterior of the wall element 39 for connection to the vertical channel 40 of the wall element just below. This connection may be made by simple juxtaposition of the vertical channels, since each is merely a housing for the plastic adducent pipes 29 of the circuit 8.

As shown in the diagram of FIG. 12, the insertion of all the conduits may be made from the exterior of the building after the walls are in place and even during occupancy of the building. A major object of the wall structure of the invention is to permit this insertion of the conduits of the circuit after construction of the building. FIG. 12 is a horizontal plan view, and shows that a wall element (such as that shown at 42) with heat accumulator elements need not connect to other wall elements; it is only necessary that a horizontal conduit pass through the bases of the heat accumulator elements. Thus all work involved in installing the conduit is done from the outside of the building. That is to say, the vertical canalization of exterior walls can allow the plastic adducent pipes and the heat dissipator to be inserted without any interference in the interior, as shown in FIGS. 12 and 13.

As shown in FIG. 7, the horizontal conduits are below the level of the floor.

Finally, it is worth noting that the thickness of the walls is conditioned by a minimum distance between the exterior surfaces and the heat accumulation elements in order to avoid any damage caused by either by nails or molly bolts. Thus, the total thickness of each wall element 39 should be at least 25 cm., as indicated in FIG. 14.

Having thus described the principles of the invention, together with an illustrative embodiment thereof, it is to be understood that, although specific terms are employed, they are used in a generic and descriptive sense, and not for purposes of limitation, the scope of the invention being set forth in the following claims.

We claim:

1. Reinforced concrete wall having a circuit embedded therein which is adapted to carry water warmed by solar panels, said wall having heat accumulation elements coupled with said circuit and being full of water the temperature whereof is regulated by said circuit, wherein each said element comprises a normal plastic pipe having a first end and a second end, a first fibroreinforced plastic component affixed to said first end and a second fibroreinforced plastic component affixed to said second end, said first component having a cylindrical bulge grafted onto its lateral surface, a fibroreinforced plastic plug having two cylindrical surfaces, with the same axis and different diameters adapted to receive the rim of said bulge therebetween so as to seal said bulge.

2. Wall according to claim 1, wherein glue has been applied in the interstice between said two cylindrical surfaces and said rim.

3. Reinforced concrete wall having a circuit embedded therein which is adapted to carry water warmed by solar panels, said well having heat accumulation elements coupled with said circuit and being full of water the temperature whereof is regulated by said circuit, wherein each said element comprises a normal plastic pipe having a first end and a second end, a first fibroreinforced plastic component affixed to said first end and a second fibroreinforced plastic component affixed to said second end, said second component having two cylindrical bulges grafted onto its lateral surface, a metallic pipe mutually connecting said bulges and respectively connected to each bulge through a seal.

4. Wall according to claim 3 wherein said second component includes a spacer made of deformable plastic which cooperates with said seals to absorb the deformations produced by the change of state from water to ice.

5. Reinforced concrete wall having a circuit which is adapted to carry water warmed by solar panels, said circuit being positioned within elements embedded in said wall, said elements comprising vertical and horizontal channels connected to one another by fibroreinforced plastic components, each said component having four cylindrical bulges grafted onto its lateral surface so as to define two orthogonal transverse axes, each said component having two bulges grafted onto its end surfaces, respectively.

6. Wall according to claim 5 wherein each of said four cylindrical bulges is equipped with threading.

7. Wall according to claim 6, including at least one sealing plug and at least one reduction plug attached to said threaded bulges.

8. A wall element for use in a prefabricated building comprising in combination a precast concrete wall element having embedded therein a plurality of tubular heat accumulator elements and at least one vertical channel, said plurality of tubular heat accumulator elements being arranged in a parallel array and so oriented that they will be positioned vertically when the wall element is installed in a prefabricated building, each of said heat accumulator elements having a pair of bulges at the lower end thereof, the bulges in said array being aligned so as to define a horizontal channel passing through the lower ends of the heat accumulator elements, a tubular membrane affixed to the interior of each of said pair of bulges so as to seal off the interior of the respective tubular heat accumulator element, said heat accumulator elements being substantially filled with water, said vertical channel having at least one connector element having apertures at least one of which communicates with the region outside said wall element, thereby permitting installation of conduits which form a water-transporting circuit including a heat dissipator conduit passing through said horizontal channel and plastic adducent pipes passing through said vertical channel.

* * * * *